(12) United States Patent
Blewitt et al.

(10) Patent No.: US 6,811,005 B2
(45) Date of Patent: Nov. 2, 2004

(54) RESILIENT DEVICE FOR SPLINED CONNECTION

(75) Inventors: Andrew John Blewitt, West Pontnewydd (GB); Anthony John Williams, Garndiffaitch (GB)

(73) Assignee: Meritor Heavy Vehicle Braking Systems (UK) Ltd. (GB)

( * ) Notice: Subject to any disclaimer, the term of this patent is extended or adjusted under 35 U.S.C. 154(b) by 14 days.

(21) Appl. No.: 10/418,733

(22) Filed: Apr. 18, 2003

(65) Prior Publication Data

US 2004/0011604 A1 Jan. 22, 2004

(30) Foreign Application Priority Data

Apr. 19, 2002 (GB) ............................................ 0208950

(51) Int. Cl.[7] .............................................. F16D 65/40
(52) U.S. Cl. .................................. 188/73.38; 192/30 V
(58) Field of Search ........................... 188/73.1–73.38, 188/71.5, 18 A, 250 D, 250 E; 192/30 V, 70.2, 70.17

(56) References Cited

U.S. PATENT DOCUMENTS 3,754,624 A * 8/1973 Eldred .................... 188/71.5
4,406,641 A 9/1983 Mallet
5,437,351 A 8/1995 Lindner
6,305,510 B1 * 10/2001 Bunker .................. 188/218 XL
6,457,567 B1 * 10/2002 Bunker ...................... 188/18 A

FOREIGN PATENT DOCUMENTS

| DE | 3844476 | 7/1990 |
|---|---|---|
| EP | 1158197 | 9/2001 |
| FR | 2497307 | 7/1982 |
| FR | 2741317 | 5/1997 |
| FR | 2749258 | 12/1997 |
| JP | 2000039027 | 7/1998 |

* cited by examiner

Primary Examiner—Matthew C. Graham
Assistant Examiner—Xuan Lan Nguyen
(74) Attorney, Agent, or Firm—Carlson, Gaskey & Olds

(57) ABSTRACT

A resilient device for minimizing noise in a splined connection includes a mounting portion and two flanges bent from the mounting portion to attach to a structure. The flanges are substantially parallel and spaced apart from each other by the mounting portion to form a substantially U-shaped profile. An arm is bent in a second direction from the mounting to lie adjacent to the mounting portion. The arm has a wavy portion having a pitch that allows it to engage with splines in the splined connection to prevent rattling in the connection without having to reduce the clearance between the splines.

22 Claims, 3 Drawing Sheets

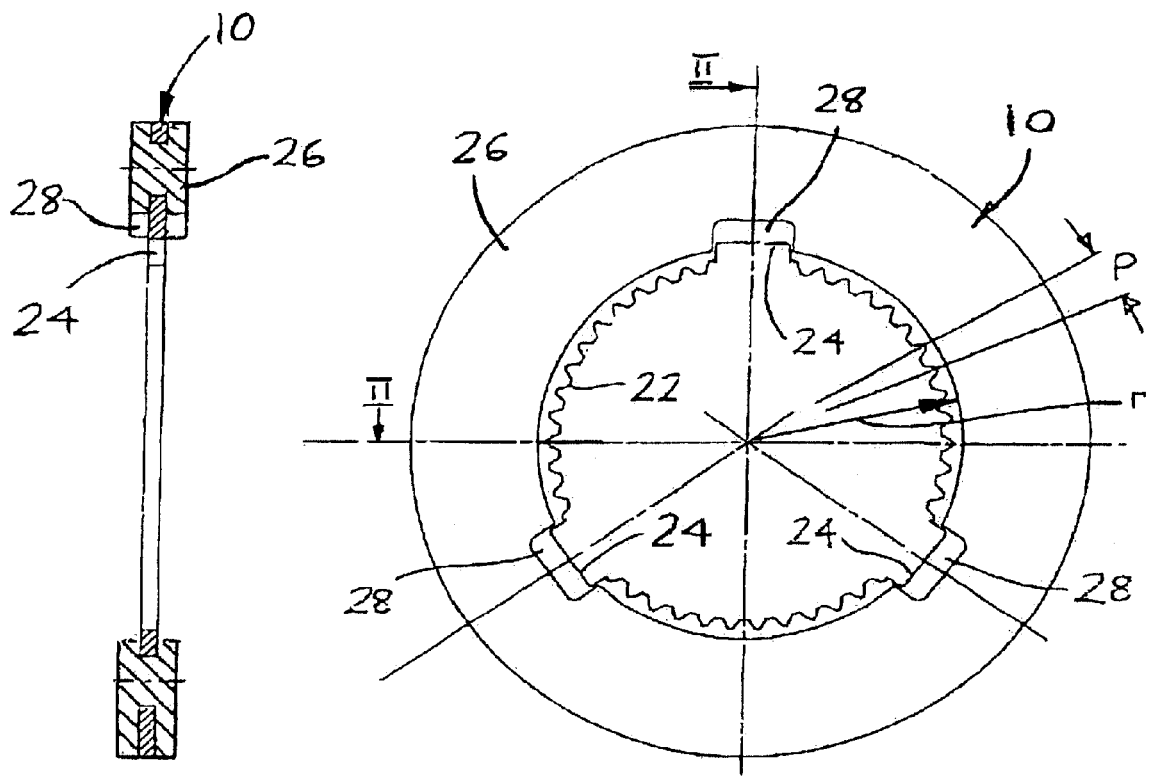
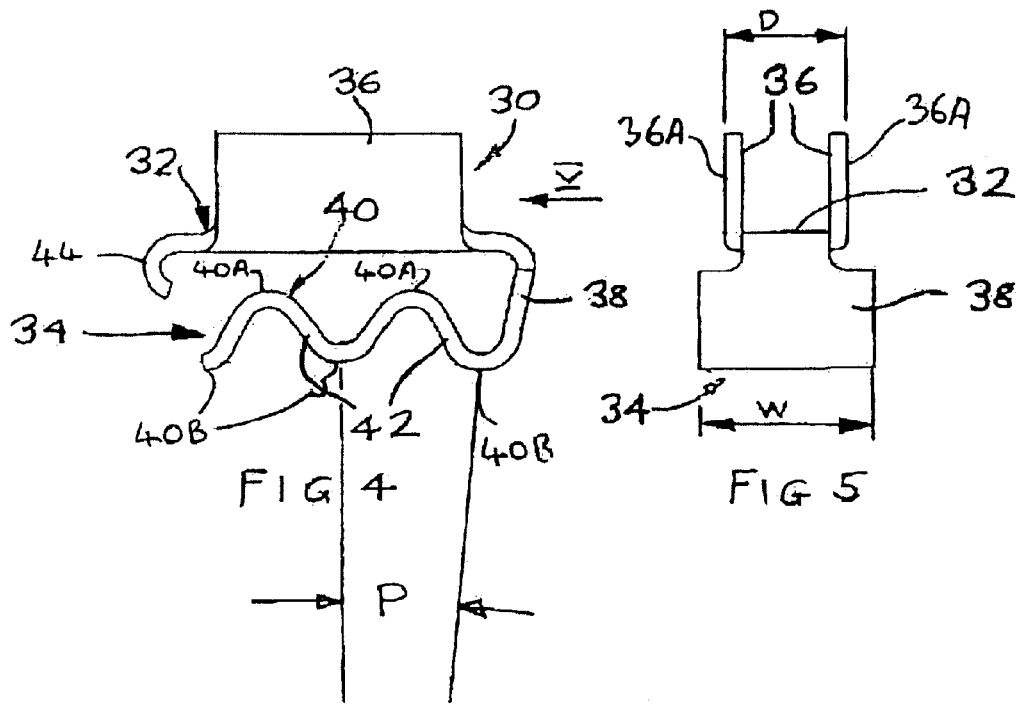

RESILIENT DEVICE FOR SPLINED CONNECTION

REFERENCE TO RELATED APPLICATIONS

The present invention claims priority from United Kingdom (GB) patent application number 0208950.6, filed Apr. 19, 2002.

TECHNICAL FIELD

The invention relates to a resilient device, and more particularly to a resilient device for reducing the effect of play in a splined connection.

BACKGROUND OF THE INVENTION

When rotatable members, such as a drive shaft and a brake disc, are drivably interconnected by mating external and internal splines, play between the splines can result in a noisy interconnection. The noise problem, which is typically a rattling noise, is a caused by a small amount of relative rotary movement between the mating internal and external splines. The play between the mating splines allows the mating splines to strike each other. If the clearance between the mating splines is reduced to minimize play, the rattling can be substantially reduced or prevented. However, smaller clearances increase the risk that the mating splines will jam together. It is difficult to achieve a balance where the clearance is sufficient to prevent jamming and yet not large enough to allow excessive rattling between the mating splines.

There is a desire for a device or structure that can reduce play in a splined connection without increasing the likelihood of jamming.

SUMMARY OF THE INVENTION

The present invention is a resilient device made from a resilient sheet material and having a mounting portion and two flanges each bent in a first direction from the mounting portion. The flanges are substantially parallel and spaced apart from each other by the mounting portion to form a substantially U-shaped profile. The inventive resilient device also includes an arm that is initially bent in a second direction, which is opposite the first direction, from the mounting portion, and then bent again to lie adjacent to the mounting portion. The arm has a wavy shape with at least one crest portion and one trough portion. In one embodiment, when the resilient device is disposed between splines on the drive shaft and the brake disc, the crest and trough portion engage with the splines on the drive shaft.

When the resilient device is fitted between rotatable members having mating splines, the device tightens the connection between the members so that the risk of noise is minimized without substantially increasing the risk of jamming.

BRIEF DESCRIPTION OF THE DRAWINGS

FIG. 2 is an end view of a brake disk of the transmission brake assembly shown in FIG. 1;

FIG. 3 is a cross-section view taken through line II—II in FIG. 2;

FIG. 4 is a end view of one embodiment of the inventive device;

FIG. 5 is an elevational view taken in the direction of arrow V in FIG. 4;

DETAILED DESCRIPTION OF THE EMBODIMENTS

The examples discussed below focuses on an inventive resilient device that reduces the effect of play between an internally splined brake disc and a mating externally splined rotary drive shaft. However, the inventive resilient device can be used to reduce play in any splined connection.

Figure 1:
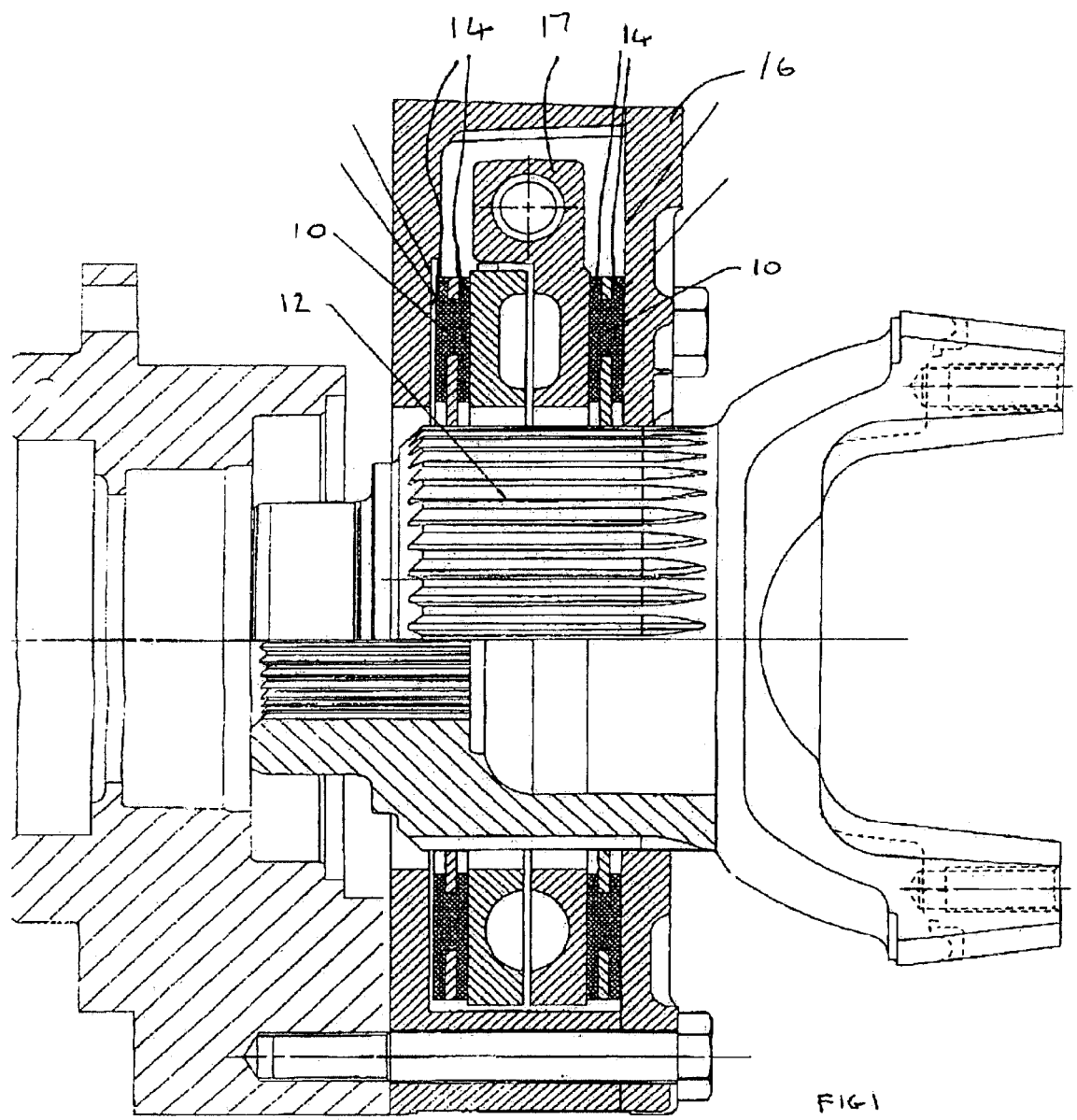
FIG. 1 is longitudinal cross-section through a transmission brake assembly incorporating one embodiment of the inventive device.

Referring to FIG. 1, a transmission brake assembly for a heavy vehicle comprises a plurality of brake discs 10 drivably connected to a drive transmission shaft 12 by splines. The discs 10 cooperate with brake surfaces 14 on a casing 16 and on a ball and ramp actuator 17 of the transmission brake. To brake the shaft 12, the brake discs 10 are moved axially along the splines against the brake surfaces 14 by the actuator 17.

Each of the brake discs 10 has a structure shown in FIGS. 2 and 3. The disc 10 in FIGS. 2 and 3 is annular with a center opening having internal splines 22. The center opening of the disc 10 also has three radially extending recesses 24 which are spaced at equal distances around the circumference of the opening. The disc 10 carries an annulus of friction material 26 on each side. The friction material 26 also has recesses 28. In this embodiment, the recesses 28 in the friction material 26 are radially deeper than the recesses 24 in the disc 10.

One embodiment of the inventive resilient device is in the form of a spring clip 30 and is illustrated in FIGS. 4 and 5. The clip 30 may be made from a resilient sheet material, such as spring sheet steel. The clip 30 has a mounting portion 32 and two flanges 36 that are each bent in a first (upward) direction from the mounting portion 32. The flanges 36 are substantially parallel with respect to each other and are spaced apart from each other by the mounting portion 32. The flanges 36 and the mounting portion 32 together form a substantially U-shaped profile (FIG. 5). The clip 30 further includes an arm 34 that is first bent in a second (downward) direction from the mounting portion 32. The arm 34 has a downwardly extending part 38 and a wavy part 40 having waves 42. The wavy part 40 includes wave crests 40A and wave troughs 40B. In one embodiment, the arm 34 is bent a total of substantially 180 degrees so that the wavy part 40 of the arm 34 lies adjacent to the mounting portion 32.

Each flange 36 has an outwardly facing flange surface 36A. The outwardly facing flange surface 36A are spaced apart by distance D, which in this embodiment is less than the width W of the arm 34.

The clip 30 also includes a return 44 at the end of the mounting portion 32 opposite the end from which the arm 34 extends. The return 44 is bent in the same direction as the arm 34 and therefore is bent in a direction opposite the direction of the flanges 36.

Figure 6:
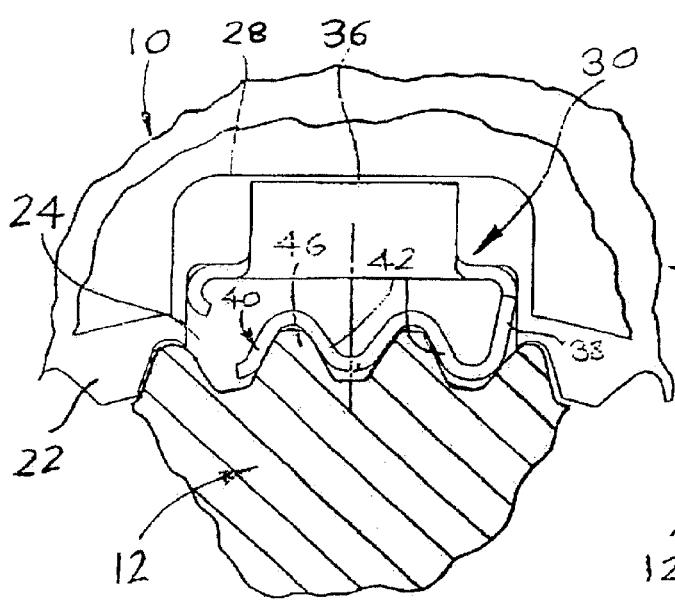
FIG. 6 is an end view illustrating one embodiment of the inventive device of FIGS. 4 and 5 after being assembled on the brake disc of FIG. 2.
Figure 7:
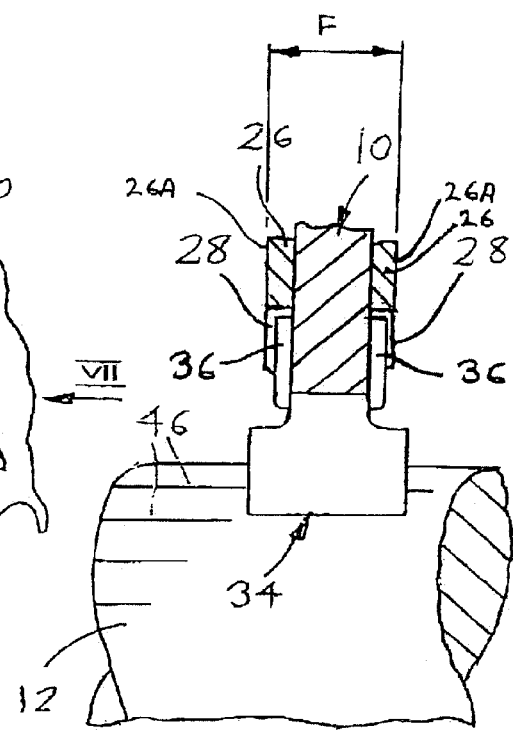
FIG. 7 is an elevational partial section view of FIG. 6 taken in the direction of arrow VII in FIG. 6.

As shown in FIGS. 6 and 7, the clip 30 is mounted on the brake disc 10 by being inserted into the recess 24. The flanges 36 of the clip 30 are positioned on either side of the disc 10. In that position, the flanges 36 lie within the recesses 28 in the friction material 26. When the clip 30 is inserted in the recess 24, the return 44 and the top end of the downwardly extending part 38 of the arm 34 frictionally grip the radial edges of the recess 24 to hold the clip 30 in place on the disc 10. Alternatively or additionally, the flanges 36 could act as a gripping device on the brake disc 10 to hold the clip 30 in place on the disc 10.

Each annulus of friction material 26 has an outwardly facing surface 26A. The outwardly facing surfaces 26A are spaced apart by a distance F, which is greater than the distance of the outwardly facing surfaces 36A of the flanges 36 (FIG. 7). This allows the inner radius r of the friction material 26 to be at a smaller radius than the flanges 36 while ensuring that the outer surfaces 36A of the flanges 36 are recessed far enough so they do not frictionally engage any brake surfaces.

It should be noted that the waves 42 have a pitch P substantially the same as the pitch of the splines 22. The waves 42 also project inwardly slightly further than the splines 22 when the clip 30 is positioned in the recess 24 in the absence of the shaft 12.

When all three clips 30 are positioned in the brake disc 10, the internal splines 22 of the disc 10 are positioned so they mate with the splines 46 of the transmission shaft 12. The disc is then slid into position on the shaft 12. The splines 46 are shown diagrammatically in FIG. 7. It will be noted that the pitch P of the waves 42 in the wavy part 40 of the clip 30 is the same as the pitch of the splines 46. When the splines 46 contact the waves 42, the wavy part 40 is urged resiliently outwards away from the shaft 12. The resilient force creates a frictional grip on the splines 46 of the shaft 12. The frictional grip between the wavy part 40 and the splines 46 effectively tightens the splined connection between the disc 10 and the shaft 12.

As a result, the clips 30 help prevent free relative rotational movement between the disc 10 and the shaft 12 and therefore between the mating splines 22, 46, reducing the effect of play between the mating splines. This minimizes the likelihood of a noisy splined interconnection. Further, using the inventive resilient clip can minimize noise without requiring a smaller spline clearance or even a tight tolerance in the spline clearance; the resilience of the clips 30 allows tolerances to be looser while still preserving noise-minimizing capabilities.

Note that in other embodiments, brake discs or clutch discs can be externally splined. The resilient element is equally applicable to such an externally splined disc.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A resilient device for reducing play between mating splines in a splined connection, comprising:
   a mounting portion having opposing first and second sides and opposing first and second ends;
   first and second flanges extending from the first and second sides of the mounting portion in a first direction, the flanges being substantially parallel and spaced apart from each other by the mounting portion, wherein the first and second flanges and mounting portion together create a substantially U-shaped profile; and
   an arm extending from the first end of the mounting portion in a second direction and having a wavy part adjacent to the mounting portion, wherein the wavy part has at least one crest portion and at least one trough portion to engage at least one spline in the splined connection.

2. A resilient device as defined in claim 1, wherein the wavy part has two or more crest portions.

3. A resilient device as defined in claim 1, wherein the wavy part has two or more trough portions.

4. A resilient device as defined in claim 1, further comprising a return extending from the second end of the mounting portion.

5. A resilient device as defined in claim 1, wherein the first and second flanges each have an outwardly facing flange surface and wherein the outwardly facing flange surfaces are spaced apart by a distance less than a width of the arm.

6. A resilient device according to claim 1, wherein the arm is bent through substantially 180 degrees with respect to the mounting portion.

7. A brake disc assembly, comprising:
   a brake disc having a plurality of disc splines and at least one recess disposed among the plurality of disc splines; and
   at least one resilient device comprising
      a mounting portion,
      first and second flanges extending from the mounting portion in a first direction, the flanges being substantially parallel and spaced apart from each other by the mounting portion, wherein the first and second flanges and mounting portion together create a substantially U-shaped profile, and
      an arm extending from the mounting portion in a second direction and having a wavy part adjacent to the mounting portion, wherein the wavy part has at least one crest portion and at least one trough portion to engage at least one of the plurality of disc splines, wherein the first flange extends on a side of a first braking surface of the brake disc and the second flange extends on a side of a second braking surface of the brake disc, opposite of the first braking surface of the brake disc, to attach the resilient device to the brake disc.

8. A brake disc assembly as defined in claim 7, wherein the mounting portion of said at least one resilient device is fitted in said at least one recess.

9. A brake disc assembly as defined in claim 7, wherein at least a portion of the resilient device grips the brake disc to hold the resilient device to the brake disc.

10. A brake disc assembly, comprising:
    a brake disc having a plurality of disc splines and at least one recess disposed among the plurality of disc splines, the brake disc having a first side and a second side, and wherein the brake disc assembly includes
       a first annulus of friction material attached to the first side; and
       a second annulus of friction material attached to the second side,
       wherein the first and second annulus each have at least one recess corresponding to said at least one recess of the brake disc; and at least one resilient device comprising
       a mounting portion,
       first and second flanges extending from the mounting portion in a first direction, the flanges being substantially parallel and spaced apart from each other by the mounting portion, wherein the first and second flanges and mounting portion together create a substantially U-shaped profile, and
       an arm extending from the mounting portion in a second direction and having a wavy part adjacent to the mounting portion, wherein the wavy part has at least one crest portion and at least one trough portion to engage at least one of the plurality of disc splines.

11. A brake disc assembly as defined in claim 10, wherein the first and second flanges of the resilient device are disposed in the respective recesses of the first annulus, the second annulus, and the brake disc.

12. A brake disc assembly as defined in claim 10, wherein the first annulus has a first outwardly facing frictional surface and the second annulus has a second outwardly facing frictional surface, the first flange has a first outwardly facing flange surface and the second flange has a second outwardly facing flange surface, and wherein the first and second outwardly facing frictional surfaces are spaced apart by a distance greater than a distance between the first and second outwardly facing flange surfaces.

13. A brake disc assembly as defined in claim 7, wherein said at least one resilient device comprises a plurality of resilient devices positioned around the brake disc substantially equidistant to each other.

14. A brake system, comprising:

a shaft having a plurality of shaft splines;

a brake disc having a plurality of disc splines that engage with the plurality of shaft splines and having at least one recess disposed among the plurality of disc splines; and at least one resilient device disposed between at least one of the plurality of shaft splines and at least one of the plurality of disc splines, the resilient device comprising a mounting portion, first and second flanges extending from the mounting portion in a first direction, the flanges being substantially parallel and spaced apart from each other by the mounting portion, wherein the first and second flanges and mounting portion together create a substantially U-shaped profile, and an arm extending from the mounting portion in a second direction and having a wavy part adjacent to the mounting portion, wherein the wavy part has at least two crest portions and at least two trough portions that engage at least one of the plurality of shaft splines, wherein the crest portions and trough portions- define an arm pitch and the plurality of shaft splines define a spline pitch, and wherein the arm pitch and the shaft spline pitch are substantially equal to each other.

15. The brake system as defined in claim 14, wherein the resilient device allows relative movement between the disc and shaft in a radial direction.

16. A brake system as defined in claim 14, wherein the mounting portion of said at least one resilient device is fitted in said at least one recess.

17. A brake system as defined in claim 14, wherein the first flange extends on a first side of the brake disc and the second flange extends on a second side of the brake disc to attach the resilient device to the brake disc.

18. A brake system as defined in claim 14, wherein at least a portion of the resilient device grips the brake disc to hold the resilient device to the brake disc.

19. A brake system as defined in claim 14, wherein the brake disc has a first side and a second side, and wherein the brake disc assembly further comprises:

a first annulus of friction material attached to the first side; and a second annulus of friction material attached to the second side, wherein the first and second annulus each have at least one recess corresponding to said at least one recess of the brake disc.

20. A brake system as defined in claim 19, wherein the first and second flanges of the resilient device are disposed in the respective recesses of the first annulus, the second annulus, and the brake disc.

21. A brake system as defined in claim 19, wherein the first annulus has a first outwardly facing frictional surface and the second annulus has a second outwardly facing frictional surface, the first flange has a first outwardly facing flange surface and the second flange has a second outwardly facing flange surface, and wherein the first and second outwardly facing frictional surfaces are spaced apart by a distance greater than a distance between the first and second outwardly facing flange surfaces.

22. A brake system as defined in claim 14, wherein said at least one resilient device comprises a plurality of resilient devices positioned around the brake disc substantially equidistant to each other.

* * * * *